Patented Jan. 10, 1933

1,893,656

UNITED STATES PATENT OFFICE

LUDWIG SANDER, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

AMIDES OF 2.3-AMINO-NAPHTHOIC ACID AND A PROCESS OF PREPARING THEM

No Drawing. Application filed July 1, 1929, Serial No. 375,333, and in Germany July 14, 1928.

The present invention relates to the hitherto unknown amides of 2.3-amino-naphthoic acid and to a process of preparing the same; more particularly it relates to new compounds of the following general formula:

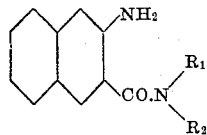

wherein $R_1$ stands for hydrogen or alkyl and $R_2$ for hydrogen, aryl or aralkyl or $R_1$ and $R_2$ for the residue

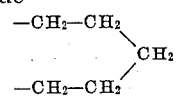

Amides of 2.3-amino-naphthoic acid have not been known hitherto and the standard processes for preparing such amides, for instance the interaction of the esters and ammonia or amines, entirely fail to work or give only very poor yields.

Now I have found that the amides of 2.3-amino-naphthoic acid which are of great value for the production of dyestuffs, are easily obtained, by first converting the 2.3-amino-naphthoic acid by means of chlorocarbonic acid esters or phosgene (for instance according to the process described in French Patent No. 603,970) into the 2.3-naphthisatoic anhydride and then causing to act upon the latter ammonia or primary or secondary amines.

The $CO_2$-group of the naphthisatoic anhydride attached to the NH-group is split off as carbonic acid.

The following equation illustrates the course of the reaction:

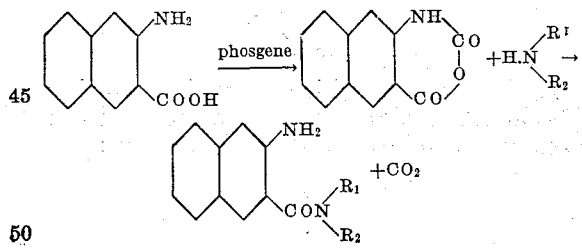

wherein $R_1$ stands for hydrogen or alkyl and $R_2$ for hydrogen, aryl or aralykl, or $R_1$ and $R_2$ for the residue

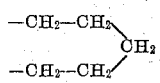

The conversion of the naphthisatoic anhydride can be carried out by means of ammonia, primary aromatic amines, secondary mixed aliphatic-aromatic amines as well as primary aliphatic amines, but not by means of every secondary aliphatic amine. By causing diethylamine to act upon 2.3-naphthisatoic anhydride, for instance, there is obtained not the desired diethylamide, but a mixture of carboxylic acids which are soluble in alkali and which possibly contain the mixed urea from naphthisatoic anhydride and diethylamine.

Other secondary amines such as piperidine, behave normally. By using piperidine there is obtained the piperidide of the 2.3-aminonaphthoic acid.

The reaction already begins at ordinary temperature; it is completed by heating the reaction mixture. When carbonic acid is no longer developed, the reaction is finished.

The 2.3-amino-naphthoic acid amides are yellow compounds soluble in organic solvents and in diluted mineral acids, insoluble in aqueous alkalies. The amides produced from secondary amines are diazotizable and, therefore, valuble components for azo dyestuffs. The amides obtained by means of primary amines yield with nitrous acid by ring-closure colorless 2.3-naphthotriazones according to the following equation:

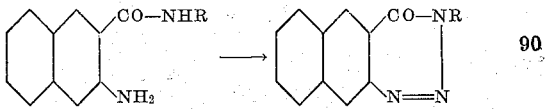

The following examples serve to illustrate my invention, but they are not intended to limit it thereto; the parts being by weight:

(1) 200 parts of 2.3-naphthisatoic anhydride are gradually entered, while stirring and cooling, into 1500 parts of alcoholic ammonia containing 5 per cent of $NH_3$. Stirring is continued for 3 hours and the temperature is gradually raised to 50° C., care being taken that the reflux apparatus is not obstructed by ammonium carbonate. The alcohol and an excess of ammonia are distilled off on the descending condenser, the residue is washed with water containing ammonia and dried in a steam chest.

The yield amounts to 60 per cent of the theory. The 2.3 - amino - naphthoic acid amide thus obtained has the formula:

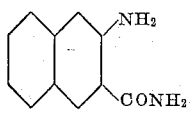

It crystallizes from pyridine in the form of brilliant greenish-yellow laminæ melting at 234° C. to 236° C.

(2) 700 parts of 2.3-naphthisatoic anhydride are heated with 2000 parts of aniline at a temperature of between 60° C. and 90° C., while vigorously stirring, until the evolution of the carbonic acid ceases. The mass is allowed to cool and to stand for 1 night. The anilide which has separated in the form of beautiful yellow laminæ is then filtered by suction, washed with methyl alcohol and water and dried.

The yield amounts to over 80 per cent of the theory.

The 2.3-amino-naphthoic anilide has the formula:

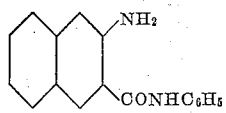

It crystallizes from pyridine in the form of laminæ melting at 237° C.

Instead of aniline there may also be used its homologues, such as for instance the toluidines or its substitution products.

(3) 100 parts of 2.3-naphthisatoic anhydride are heated, while stirring with 150 parts of monomethylaniline, advantageously to about 80° C., until the evolution of carbonic acid ceases. After the mass has been allowed to stand for 12 hours at an atmospheric temperature, the crystalline magma thus formed is filtered by suction, washed with cold methyl alcohol and dried.

The 2.3-amino-naphthoic acid-methylanilide which has the formula:

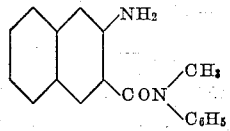

crystallizes from pyridine in the form of coarse, feebly yellow needles melting at 165° C.

The reaction may also be carried out by monoethyl-aniline as well as by homologues and substitution products of methyl- or ethyl-aniline.

(4) Into a mixture of 100 parts of benzylamine and 200 parts of pyridine 200 parts of 2.3-naphthisatoic anhydride are entered, while stirring and cooling. The mixture is then heated to boiling on the reflux apparatus until the evolution of carbonic acid ceases.

The mixture is then allowed to cool, filtered by suction, after the crystallization is finished, washed with methyl alcohol, ammonia and water and finally dried. The yield amounts to 70 per cent of the theory. The 2.3-amino-naphthoic acid-benzylamide which has the formula:

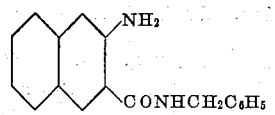

crystallizes from pyridine in faintly yellow laminæ melting at 210° C. Also benzylamine substituted in the phenyl residue reacts with naphthisatoic anhydride while forming the corresponding amide.

(5) 750 parts of 2.3-naphthisatoic anhydride are mixed with 800 parts of pyridine and 500 parts of piperidine and heated, while stirring, to a temperature of between 60° C. and 100° C., until the evolution of carbonic acid is finished. The mixture is then allowed to cool and to stand for 12 hours; the crystalline magma thus formed is filtered by suction, washed with methyl alcohol, ammonia and water and finally dried.

The 2.3-amino-naphthoic acid-piperidide which has the formula:

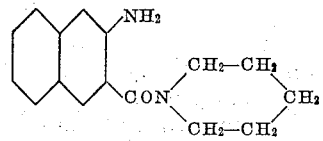

crystallizes from alcohol in faintly yellow flat needles or laminæ melting at 157° C. to 158° C.

1 claim:
1. The process which comprises causing 2.3-naphthisatoic anhydride to react with a base of the following general formula:

wherein $R_1$ stands for hydrogen or alkyl, $R_2$ stands for hydrogen, aryl or aralkyl, or $R_1$ and $R_2$ for the residue

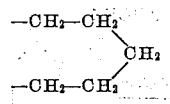

2. The process which comprises causing 2.3-naphthisatoic anhydride to react with a base of the following general formula:

wherein $R_1$ stands for hydrogen or alkyl, $R_2$ for hydrogen or aryl, or $R_1$ and $R_2$ for the residue

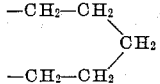

3. The process which comprises causing 2.3-naphthisatoic anhydride to react with a base of the following general formula:

wherein $R_1$ stands for hydrogen or alkyl, $R_2$ stands for hydrogen or a radical of the benzene series.

4. The process which comprises causing 2.3-naphthisatoic anhydride to react with a base of the following general formula:

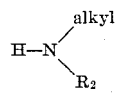

wherein $R_2$ stands for hydrogen or a radical of the benzene series.

5. The process which comprises causing 2.3-naphthisatoic anhydride to react with a base of the following general formula:

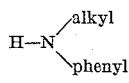

6. The process which comprises causing 2.3-naphthisatoic anhydride to react with monomethylaniline.

7. As new products, the amides of the 2.3-amino-naphthoic acid of the following general formula:

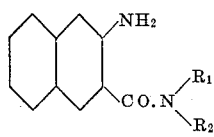

wherein $R_1$ stands for hydrogen or alkyl, $R_2$ for hydrogen, aryl or aralkyl, or $R_1$ and $R_2$ for the residue

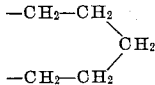

being yellow compounds soluble in organic solvents and in diluted mineral acids, insoluble in aqueous alkalies.

8. As new products, the amides of the 2.3-amino-naphthoic acid of the following general formula:

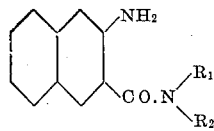

wherein $R_1$ stands for hydrogen or alkyl, $R_2$ for hydrogen or aryl or $R_1$ and $R_2$ for the residue

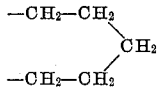

being yellow compounds, soluble in organic solvents and in diluted mineral acids, insoluble in aqueous alkalies.

9. As new products, the amides of the 2.3-amino-naphthoic acid of the following general formula:

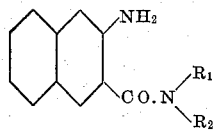

wherein $R_1$ stands for hydrogen or alkyl, $R_2$ stands for hydrogen or a radical of the benzene series, being yellow compounds, soluble in organic solvents and in dilute mineral acids, insoluble in aqueous alkalies.

10. As new products, the amides of the 2.3-amino-naphthoic acid of the following general formula:

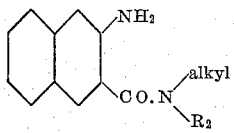

wherein $R_2$ stands for hydrogen or a radical of the benzene series, being yellow compounds, soluble in organic solvents and in dilute mineral acids, insoluble in aqueous alkalies.

11. As new products, the amides of the 2.3-amino-naphthoic acid of the following formula:

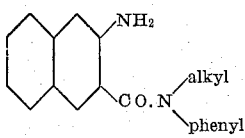

being yellow compounds, soluble in organic solvents and in dilute mineral acids, insoluble in aqueous alkalies and forming diazonium compounds when treated with nitrite and an acid.

12. As a new product, 2.3-amino-naphthoic acid-N-methyl anilid of the following formula:

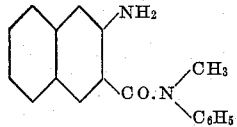

crystallizing from pyridine in the form of coarse, feebly yellow needles melting at 165° C.

In testimony whereof, I affix my signature.
LUDWIG SANDER.